United States Patent [19] [11] 4,397,975
Harris [45] Aug. 9, 1983

[54] HEAT STABILIZED POLYMERS

[75] Inventor: Alva F. Harris, Wilbraham, Mass.

[73] Assignee: Monsanto Company, St. Louis, Mo.

[21] Appl. No.: 324,900

[22] Filed: Nov. 25, 1981

[51] Int. Cl.³ .............................................. C08K 5/41
[52] U.S. Cl. .................................... 524/155; 524/158
[58] Field of Search .............................. 524/155–158; 525/74–78

[56] References Cited

U.S. PATENT DOCUMENTS 3,794,616  2/1974  Dennis et al. ...................... 260/45.7
4,223,096  9/1980  Lee et al. .............................. 525/74
4,305,869 12/1981  Lee et al. .............................. 525/84

FOREIGN PATENT DOCUMENTS 1044975 10/1966  United Kingdom ................ 524/158

OTHER PUBLICATIONS

Research Disclosure "Thermoplastic Polyblends", #20814, Aug. 17, 1981.

Primary Examiner—Theodore Morris
Attorney, Agent, or Firm—W. J. Farrington; P. D. Matukaitis; A. H. Cole

[57] ABSTRACT

The tendency to crosslink of polymer compositions comprising polymer units derived from acrylonitrile and maleic anhydride is controlled by the use of a sulfur acid.

4 Claims, No Drawings

HEAT STABILIZED POLYMERS

BACKGROUND OF THE INVENTION

This invention relates to polymers and polyblends, comprising, as polymerized components, an unsaturated dicarboxylic acid anhydride and an unsaturated nitrile. More specifically, it relates to such polymers and polyblends that have been stabilized against certain effects of high temperatures.

It has been found that when maleic anhydride and acrylonitrile are present in the same polymeric environment, there is an apparent tendency for a reaction to occur that results in crosslinking and sometimes the evolution of carbon dioxide and/or water. This reaction occurs at elevated temperatures of the kind that can be reached during extrusion and molding operations. It would appear that the crosslinking occurs whether the acrylonitrile and maleic anhydride components are in the same or different polymer molecules.

The effect increases in significance with the amounts of the components and generally above about 15% of each component in a polymer composition is enough to generate the effect to a noticeable extent if the temperature is sufficiently elevated, that is above about 265° C.

While it is usually possible to extrude and mold at lower temperatures where no problem is encountered, it is desirable to provide accommodation for the wide variation of conditions that occur as a matter of course in a commercial operation. The present invention provides a means of reducing the significance of the crosslinking effect thus permitting the use of a wider range of molding and extrusion conditions with such polymers.

DISCUSSION OF THE PRIOR ART

The crosslinking effect referred to above has been identified, for example, in U.S. Pat. No. 4,223,096 which describes the preparation of rubber modified terpolymers of styrene, maleic anhydride and acrylonitrile. In that patent, the crosslinking tendency is controlled by the use of chain transfer agents such that up to about 20% acrylonitrile can be incorporated in a polymer containing from 15% to 30% of maleic anhydride before the crosslinking tendency renders the polymer non-thermoformable.

Other polymers in which such a tendency might be encountered in at least part of the ranges described include those described in U.S. Pat. Nos. 3,642,949, 4,141,934, 4,167,543, 4,197,263, 4,197,376 and 4,205,140.

The present invention provides a means of controlling this tendency and makes it possible either to extend the composition range so as to achieve even more advantageous properties, or to broaden the range of permissible processing conditions for the polymers.

DESCRIPTION OF THE INVENTION

The present invention provides a polymer composition with a reduced tendency to generate crosslinks comprising polymer units derived from an unsaturated nitrile and an unsaturated dicarboxylic acid anhydride, which composition comprises an effective amount between from 0.001 to 0.005 mole of a sulfur acid per 100 gm of the polymer.

The polymeric composition can be provided by a single polymer or it may be a blend of polymers. Thus, the polymeric composition can be, for example, a styrene maleic anhydride/acrylonitrile terpolymer (or its rubber-modified equivalent) or a blend of a styrene/maleic anhydride copolymer (or its rubber-modified equivalent) with a styrene/acrylonitrile copolymer or an acrylonitrile/butadiene/styrene (ABS) copolymer or a nitrile rubber.

In general, the crosslinking effect begins even where the proportions of the nitrile and anhydride components are quite low but as might be expected, the significance of the effect increases proportionately with the amounts. Thus, the present invention has particular utility when the proportions of the nitrile and anhydride components are each above about 5% by weight of the composition weight. The process of the invention is particularly useful when the proportion of anhydride in the composition is between about 5 and 30% and the nitrile proportion is between about 5 and 20% of the total polymer composition.

The term sulfur acid is herein used to indicate a compound containing sulfur that yields a hydrogen ion when dissolved in water. The term "acid" therefore indicates a conventional Bronsted acid and the acid selected is preferably an organic acid though inorganic sulfur acids such as sulfuric acid may be used. Aliphatic sulfonic acids such as methane sulfonic acid and halogen substituted alkyl sulfonic acids can be used but the preferred organic sulfur acids are aromatic acids such as benzene sulfonic acid, dodecyl benzene sulfonic acid, toluene sulphonic acid, xylene sulfonic acid and naphthalene sulphonic acid. Excellent results have been obtained using para-toluene sulphonic acid.

The amount added can be from about 0.001 up to 0.005 mole acid per 100 gm of the polymer composition weight. With some acids, however, increasing the amount added leads to an increase in the degree of crosslinking probably by a different mechanism to that initially suppressed by the use of the acid. Thus, with above about 0.005 mole per 100 gm of polymer of toluene sulfonic acid the crosslinking effect seems to increase in significance and the optimum level appears to lie in the range from about 0.002 to 0.004 mole per 100 gm of polymer. The optimum effective range will differ with each additive, but in practice, the best properties are obtained within the above-stated range for all sulfur acids.

The acid can be added in any convenient manner but it is found that, when the anhydride-containing component and the nitrile containing component are in different polymers, there is advantage in blending a portion of the acid with each polymer component before they are blended together or alternatively with the nitrile containing component alone. The reason for this effect is not known for certain but it may simply be a reflection of the better dispersion of the additive thereby obtained.

DESCRIPTION OF THE PREFERRED EMBODIMENTS

To illustrate the invention further a number of sulfur acids were blended with a polyblend comprising 37% by weight of a styrene/maleic anhydride/methyl methacrylate terpolymer comprising about 25.5% by weight of maleic anhydride and 63% of ABS (SAN-grafted polybutadiene particles dispersed in a matrix of an SAN copolymer) comprising about 13.7% by weight of acrylonitrile.

Except where otherwise indicated the terpolymer and a first ABS component were blended together with a plasticizer (where one was used), and with the acid.

This was then blended with a further ABS component to give the above blend. The blend was dried at 80° C. in a circulating air oven and extruded in a one inch Killion extruder using a two stage screw with vent or compounded in a Banbury mixer. Blending temperatures of about 200° C. were used.

Pellets of the blend were vacuum dried 16 hours at 80° C. and molded in a one ounce Arburg molding machine using 800 psi pressure. Izod bars (1.27 cm×1.27 cm×12.7 cm) were molded directly from the Arburg at a stock temperature of 260° C., and also after "Dwell Times" (i.e. length of time in Arburg at stock temperature) of 5, 10 and 15 minutes. At each time, three bars were molded and inspected closely to determine the extent of any blistering (indicating decomposition) that had occurred. The bars were then ground in a Thomas mill. The ground bars were vacuum dried 16 hours and used to measure apparent viscosity at 100 sec$^{-1}$ at 246° C. using a Monsanto Automatic Capillary Rheometer. (Both the rheometer and the method for obtaining apparent viscosity are described in the Instruction Manual for Model 3501-H Automatic Capillary Rheometer designed and developed by Dr. Samuel Steingiser, Monsanto Research Corporation, Dayton, Ohio, April 1972 Edition.) The change in apparent viscosity gives an excellent indication of the changes that occur after exposure to the elevated temperature for prolonged periods. A higher viscosity indicates an increase in molecular weight due to crosslinking.

EXAMPLE 1

This Example illustrates the use of sulfuric acid to control crosslinking in the above composition. A comparative run (no acid) and runs incorporating 0.125% and 0.25% of sulfuric acid were performed. The acid was incorporated as a 98% solution. The results are shown in Table 1 below.

TABLE 1

| | SULFURIC ACID ADDITIVE | | | | |
|---|---|---|---|---|---|
| Dwell Time | Apparent Viscosity (Kp) | | | Blistering | |
| (Min.) | No Acid | 0.125% | 0.25% | No Acid | 0.25% Acid |
| 0 | 14.0 | 13.2 | 13.0 | None | None |
| 5 | 15.0 | 14.9 | 13.4 | Few Blisters | None |
| 10 | 17.3 | 17.0 | 14.9 | Blisters | Blisters |

As can be seen the sulfuric acid is not very effective at a level of 0.125% (0.0013 mole/100 gm polymer) but at 0.25% (0.0026 mole/100 gm polymer) the crosslinking as evidenced by the increase in apparent viscosity has been significantly reduced. In addition, it would appear that evolution of gas as evidenced by the blistering of the bar has likewise been delayed by the presence of the acid.

EXAMPLE 2

This Example uses the same formulation as Example 1 except that 0.79% (0.0024 mole/100 gm polymer) of dodecyl benzene sulfonic acid was blended into the formulation. The results are set forth in Table 2 below.

TABLE 2

| DODECYL BENZENE SULFONIC ACID ADDITIVE | | | |
|---|---|---|---|
| Amount of Acid | Dwell Time (Min.) | Apparent Viscosity (Kp) | Blistering |
| 0% | 0 | 14.0 | None |
| | 5 | 15.0 | Few Blisters |
| | 10 | 17.3 | Blisters |
| 0.79% | 0 | 12.4 | None |
| | 5 | 12.9 | Few Blisters |
| | 10 | 14.8 | Few Blisters |

As will be appreciated from the above the dodecyl benzene sulfonic acid significantly reduces the crosslinking and also appears to moderate the severity of blistering even at 0.79% addition.

EXAMPLE 3

This Example illustrates the use of para-toluene sulfonic acid monohydrate to achieve the stabilization of a polyblend similar to that used in Example 1 except that 50% of the polyblend weight is provided by each of the terpolymer and the ABS. The results are set forth in Table 3 below.

TABLE 3

| Para-Toluene Sulfonic Acid Additive | | | |
|---|---|---|---|
| Amount of Acid | Dwell Time (Min.) | Apparent Viscosity (Kp) | Blistering |
| % Acid (Control) | 0 | 20.5 | None |
| | 5 | 20.1 | Few Blisters on surface |
| | 10 | 26.7 | Blisters |
| | 15 | 32.0 | Blisters and swelling |
| 0.50 | 0 | 18.6 | None |
| | 5 | 19.4 | One or two small blisters |
| | 10 | 20.6 | Surface blisters |
| | 15 | 21.6 | Surface blisters |
| 1.0% | 0 | 21.5 | None |
| | 5 | 23.6 | Surface blisters |
| | 10 | 25.1 | Surface blisters and swelling |
| | 15 | 28.4 | Surface blisters and swelling |
| 2.0% | 0 | 30.6 | None |
| | 5 | 35.2 | Surface blisters |
| | 10 | 38.1 | Severe blisters |

This set of runs illustrates the danger of incorporating an excessive amount of the acid. Here, for example, at 1% and 2% of the acid (0.005 and 0.011 mole/100 gm polymer respectively) the effect was significantly detrimental whereas at 0.5% (0.003 mole/100 gm polymer), the acid was effective to control crosslinking and blistering.

EXAMPLE 4

The following Example describes the results obtained using para-toluene sulfonic acid monohydrate in the formulation used in Examples 1 and 2. The ABS and the sulfonic acid additive (0.265, 0.371, 0.435, 0.477, 0.583% by weight) were blended together in a Banbury mixer and this blend was extruded with the terpolymer. The results obtained are set forth in Table 4 below.

TABLE 4

| Para-Toluene Sulfonic Acid Additive | | | |
|---|---|---|---|
| Para toluene sulfonic acid, % (mole/100 gm. polymer) | Dwell Time (Min.) | Apparent Viscosity (Kp) | Blistering |
| None | 0 | 14.4 | None |
| | 5 | 15.7 | Blisters |
| | | | Blisters |

TABLE 4-continued

| Para-Toluene Sulfonic Acid Additive | | | |
|---|---|---|---|
| Para toluene sulfonic acid, % (mole/100 gm. polymer) | Dwell Time (Min.) | Apparent Viscosity (Kp) | Blistering |
| | 10 | 18.6 | plus slight swelling |
| 0.265 (0.0014) | 0 | 12.4 | None |
| | 5 | 12.8 | Blisters |
| | 10 | 15.5 | Blister |
| 0.371 (0.0020) | 0 | 12.0 | None |
| | 5 | 12.3 | None to few |
| | 10 | 14.6 | Blisters |
| 0.477 (0.0025) | 0 | 12.1 | None |
| | 5 | 13.0 | None |
| | 10 | 14.4 | Blisters |
| 0.583 (0.0031) | 0 | 12.3 | None |
| | 5 | 12.5 | None |
| | 10 | 14.4 | Blisters |

Clearly, the crosslinking problem and blistering are significantly controlled at para toluene sulfonic acid monohydrate levels between 0.265 and 0.583%.

From the above Examples it will be seen that a wide range of sulfur acids is effective in controlling crosslinking and delaying the onset of blistering normally encountered in thermoforming a polyblend comprising units derived from an unsaturated anhydride monomer and an unsaturated nitrile monomer.

The polymer composition whose processability is improved by the use of the sulfur acid compounds can be single polymers such as terpolymer of styrene, maleic anhydride and acrylonitrile or a rubber-modified version of such a polymer as described, for example, in U.S. Pat. No. 4,262,096. Preferred terpolymers of this type comprise from 15 to 30% by weight of maleic anhydride and from 5 to 20% by weight of acrylonitrile. Particularly advantageous terpolymers containing from 10 to 30% by weight of a rubber having a glass transition temperature below 0° C. and preferably below −30° C. Suitable rubbers include polybutadiene, a rubbery copolymer of styrene or acrylonitrile and butadiene, polyisoprene, polychloroprene, EPDM rubbers, ethylene/vinyl acetate rubbers, acrylate rubbers and polypentenamer.

Alternatively, and often preferably some or all of the unsaturated nitrile can be provided by a different polymer from that providing the unsaturated dicarboxylic acid anhydride. Thus, the polymer composition can comprise an anhydride-containing polymer such as a styrene/maleic anhydride copolymer preferably one containing at least 10% by weight, and more preferably at least 20% by weight such as from 20 to 35% by weight of maleic anhydride, or a terpolymer with part of the styrene replaced by a nonnitrile copolymerizable monomer such as an acrylate or methacrylate ester so as to provide from 2 to 20% of the copolymer weight. The anhydride-containing polymer can, of course, be rubber-modified.

The nitrile-containing component of such a polymer composition can be provided by polymers such as styrene/acrylonitrile comprising from 20 to 70% by weight of acrylonitrile and acrylonitrile/butadiene/styrene (ABS) wherein the acrylonitrile content is preferably at least 8% and more preferably at least 15% of the ABS polymer weight.

The above exemplification is in terms of maleic anhydride and acrylonitrile but it is understood that some or all of these monomers can be replaced by their well known homologues such as (respectively) itaconic anhydride, aconitic anhydride and citraconic anhydride and methacrylonitrile.

In addition to the sulfur acid the polymer composition can contain other conventional additives such as antioxidants, plasticizers, chain-transfer agents, flame retardants, flow aids, pigments, antistatic additives, fibrous or particulate fillers and the like, to improve specific aspects of their physical or chemical properties. It is intended that all such and related modifications be considered within the purview of the invention.

What is claimed is:

1. A polymeric composition having a reduced tendency to crosslink during fabrication, which composition comprises a polyblend of (a) a styrene maleic/anhydride polymer containing 50 to 83% by weight of styrene, from 10 to 35% by weight of maleic anhydride and from 0 to 20% by weight of methyl methacrylate; (b) a polymer selected from the group consisting of acrylonitrile-butadiene-styrene polymers having an acrylonitrile content of at least 8% by weight and styrene-acrylonitrile polymers having an acrylonitrile content from 20 to 70% by weight; and (c) an effective amount from about 0.001 to 0.005 mole per 100 gm of polymer, of a sulfur acid.

2. A polymeric composition according to claim 1 in which the sulfur acid is an organic sulfonic acid.

3. A polymeric composition according to claim 1 in which the sulfur acid is an aromatic sulfonic acid.

4. A polymeric composition according to claim 1 in which the sulfur acid is para-toluene sulfonic acid and is present in an amount of from 0.002 to 0.004 mole per 100 gm of polymer.

* * * * *